United States Patent [19]

Bahl et al.

[11] Patent Number: 5,129,001
[45] Date of Patent: Jul. 7, 1992

[54] METHOD AND APPARATUS FOR MODELING WORDS WITH MULTI-ARC MARKOV MODELS

[75] Inventors: Lalit R. Bahl, Amawalk; Jerome R. Bellegarda, Goldens Bridge; Peter V. De Souza, Yorktown Heights; Ponani S. Gopalakrishnan, Croton-on-Hudson; David Nahamoo; Michael A. Picheny, both of White Plains, all of N.Y.

[73] Assignee: International Business Machines Corporation, Armonk, N.Y.

[21] Appl. No.: 514,075

[22] Filed: Apr. 25, 1990

[51] Int. Cl.$^5$ .............................................. G10L 5/06
[52] U.S. Cl. ...................................................... 381/43
[58] Field of Search ................. 364/513.5; 381/41-45; 395/2

[56] References Cited

U.S. PATENT DOCUMENTS

| | | | |
|---|---|---|---|
| 4,718,094 | 1/1988 | Bahl et al. | 381/43 |
| 4,741,036 | 4/1988 | Bahl et al. | 381/43 |
| 4,829,577 | 5/1989 | Kuroda et al. | 381/45 |
| 4,833,712 | 5/1989 | Bahl et al. | 381/43 |

OTHER PUBLICATIONS

Nishimura et al., "Speaker Adaptation Method for HMM-Based Speech Recognition," IEEE Int'l Conf. on Acoustics, Speech, and Signal Processing, 11-14 Apr. 1988, pp. 207-210.

Jelinek, "Continuous Speech Recognition by Statistical Methods," Proc. of the IEEE, vol. 64, No. 4, Apr. 1976, pp. 532-556.

Primary Examiner—Dale M. Shaw
Assistant Examiner—David D. Knepper
Attorney, Agent, or Firm—Marc D. Schechter

[57] ABSTRACT

Modeling a word is done by concatenating a series of elemental models to form a word model. At least one elemental model in the series is a composite elemental model formed by combining the starting states of at least first and second primitive elemental models. Each primitive elemental model represents a speech component. The primitive elemental models are combined by a weighted combination of their parameters in proportion to the values of the weighting factors. To tailor the word model to closely represent variations in the pronunciation of the word, the word is uttered a plurality of times by a plurality of different speakers. Constructing word models from composite elemental models, and constructing composite elemental models from primitive elemental models enables word models to represent many variations in the pronunciation of a word. Providing a relatively small set of primitive elemental models for a relatively large vocabulary of words enables models to be trained to the voice of a new speaker by having the new speaker utter only a small subset of the words in the vocabulary.

18 Claims, 6 Drawing Sheets

METHOD AND APPARATUS FOR MODELING WORDS WITH MULTI-ARC MARKOV MODELS

BACKGROUND OF THE INVENTION

The invention relates to the production of acoustic models of words for use in automatic speech recognition.

The acoustic modeling of words using hidden Markov models have been described in, for example, U.S. Pat. No. 4,759,068. In the speech recognition system described in that patent, and in other speech recognition system described in that patent, and in other speech regonition systems, an acoustic model for each word in the recognizer vocabulary is constructed by concatenating one or more elemental models selected from a finite alphabet of elemental models. Because each elemental model represents only a portion of a word, it is possible to construct models for each word in a large vocabulary of words from a relatively small alphabet of elemental models.

The use of a relatively small alphabet of element models in constructing an acoustic model for each word in a relatively large vocabulary of words has at least two advantages. First, the amount of electronic memory required to store the structure and parameters of the entire alphabet of elemental models and the information necessary to construct each word model from the alphabet of elemental models is significantly less than the amount of electronic memory required to store the structure and parameters of a whole acoustic model for each word in the vocabulary. Second, since the alphabet of elemental models is much smaller than the vocabulary of words, a new speaker can train the entire alphabet of elemental models to his voice by uttering a relatively small number of words.

Despite the advantages described above, in the known methods of constructing acoustic models of words from a finite alphabet of elemental models, it has been found that there are portions of words whose pronunciation cannot adequately be represented by a single elemental model.

SUMMARY OF THE INVENTION

It is an object of the invention to product acoustic models of words which more closely represent variations in pronunciation of the words.

It is an object of the invention to construct an acoustic model of a word from a finite set or alphabet of elemental models in such a way as to more accurately represent the pronunciation of each portion of the word.

It is another object of the invention to construct improved acoustic models of words which can be trained to the voice of a new speaker by having the new speaker utter only a relatively small number of words in the vocabulary of the speech recognition system.

According to the invention, a method of modeling a word comprises defining a finite set of n speech components, where n is an integer greater than or equal to two. A primitive elemental model is provided for each component. Each primitive elemental model has a starting state and has at least one parameter having a value. The starting states of at least first and second primitive elemental models of different speech components are combined to for a composite elemental model ahving at least first and second weighting factors, respectively. Each weighting factor has a prior value. The primitive elemental models are combined by a weighted combination of their parameters in proportion to the values of the weighting factors.

A series of elemental models are concatenated to form a word model. At least one elemental model in the series is the composite elemental model. Preferably, all of the elemental models forming the word model are composite elemental models.

Before or after the formation of the word model, the word is uttered one or more times. Each utterance of the word produces an observed sequence of component sounds.

From the prior values of the first and second weighting factors and from the values of the parameters of the first and second primitive elemental models, the conditional probability of occurrence of the first primitive elemental model given the occurrence of the composite elemental model and given the occurrence of the observed sequence of component sounds is estimated. A posterior value for the first weighting factor is estimated from the conditional probability.

In one aspect of the invention, the conditional probability is estimated by estimating, from the prior values of the first and second weighting factors and from the values of the parameters of the first and second primitive elemental models, the probability of occurrence of the composite elemental model given the occurrence of the observed sequence of component sounds, and by estimating, from the prior values of the first and second weighting factors and from the values of the parameters of the first and second primitive elemental models, the joint probability of occurrence of the first primitive elemental model and the composite elemental model given the occurrence of the observed sequence of component sounds. The conditional probability is estimated as the ratio of the joint probability to the probability of occurrence of the composite elemental model given the observed sequence of component sounds.

The probability of occurrence of the composite elemental model may be obtained by estimating, for each component sounds in the observed sequence of component sounds, the probability that the component sound was produced by the composite elemental model given the occurrence of the observed sequence of component sounds. The joint probability may be obtained by estimating, for each component sound in the observed sequence of component sounds, the probability that the component sound was produced by the first primitive elemental model and the composite elemental model given the occurrence of the observed sequence of component sounds.

From the prior values of the first and second weighting factors, and from the values of the parameters of the first and second primitive elemental models, the conditional probability of occurrence of the second primitive elemental model given the occurence of the composite elemental model and given the occurrence of the observed sequence of component sounds is estimated. A posterior value for the second weighting factor is estimated from the second conditional probability.

Preferably, the starting states of the first and second primitive elemental models are combined by a linear weighted combination.

It is also preferred that in determining the weighting factors, the word is uttered a plurality of times by a plurality of different speakers.

In an aspect of the invention, the value of the parameter of each elemental model represents a probability of producing a component sound.

An apparatus according to the present invention for modeling a word comprises means for storing a finite set of n primitive elemental models. Means are also provided for combining the starting states of at least first and second primitive elemental models of different speech components to form a composite elemental model, and for concatenating a series of elemental models to form a word model. At least one elemental model in the series is the composite elemental model.

The apparatus further includes means for measuring the value of at least one feature of one or more utterances of the word. Each utterance occurs over a series of successive time intervals. The measuring means measures the feature value of the utterance during each time interval to produce a sequence of observed acoustic vector signals representing the feature values.

Finally, the apparatus includes means for estimating, from the prior values of the first and second weighting factors and from the values of the parameters of the first and second primitive elemental models, the conditional probability of occurence of the first primitive elemental model given the occurrence of the composite elemental model and given the occurrence of the observed sequence of acoustic vector signals. Means are provided for estimating a posterior value for the first weighting factor from the conditional probability. The method and apparatus for producing an acoustic model for a word according to the present invention are advantegoud because they can be used to construct an acoustic model which is a closer representation of the different possible pronunciations of a word, yet without increasing the size of the alphabet of primitive elemental models, and without increasing the number of words a new speaker must utter to train the primitive elemental models to his voice.

DESCRIPTION OF THE PREFERRED EMBODIMENTS

Figure 1:
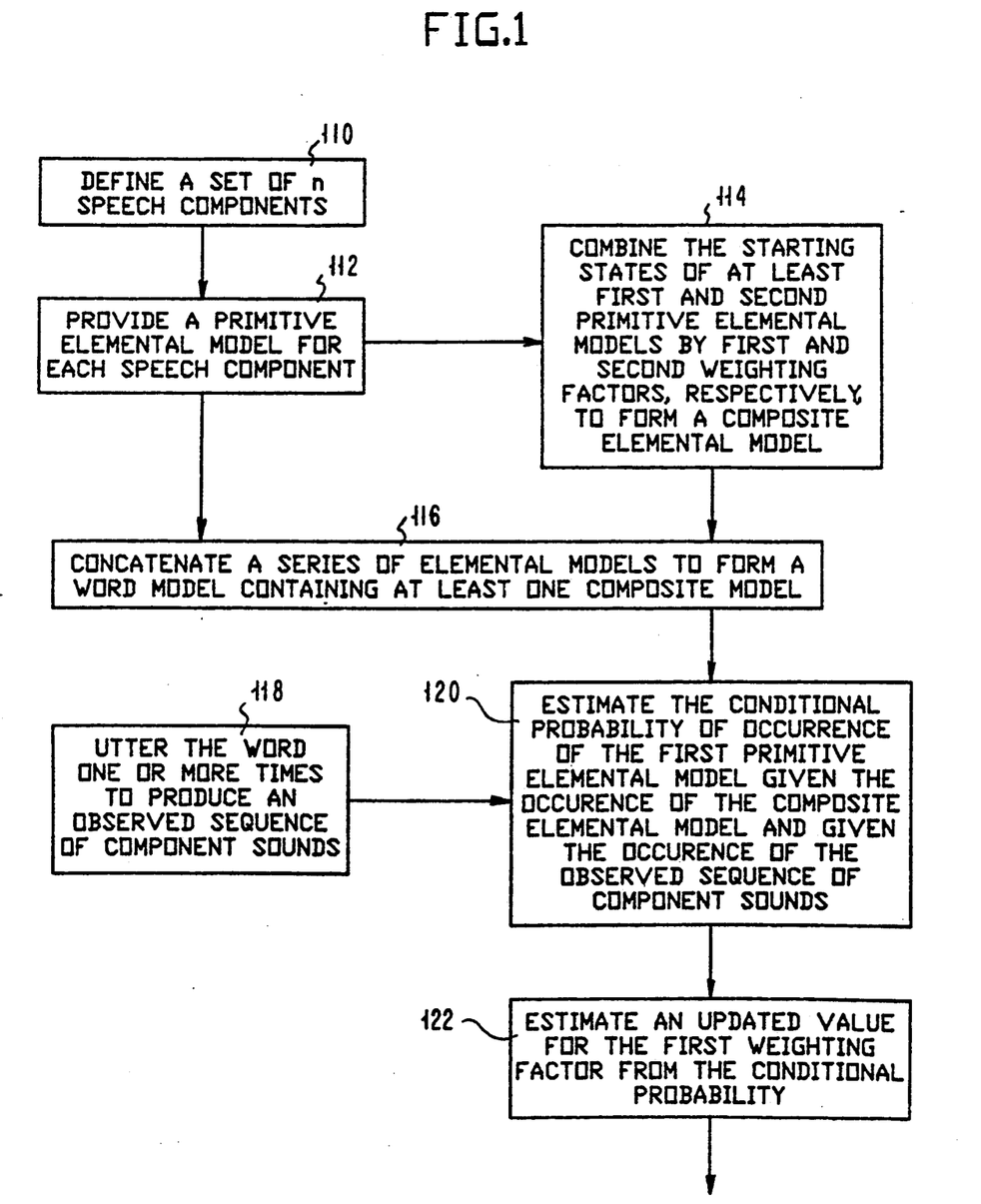
FIG. 1 is a flow chart of an embodiment of the method of modeling a word according to the invention.

Referring to FIG. 1, the method and apparatus for modeling a word according to the present invention start with a finite set of n speech components, where n is an integer greater than or equal to two. (Step 110) The speech components may be, for example, phonetic speech components, each of which generally correspond to the sound produced by a single letter of the English alphabet.

Alternatively, each speech component may be defined as a unit of speech having a measurable probability distribution for producing one or more component sounds during a fixed time interval. In the latter case, the alphabet of speech components may consist, for example, of 210 speech components of 10 milliseconds duration each.

Each speech component in the set or alphabet of speech components is modeled with a primitive elemental model. (Step 112) Each primitive elemental model has a starting state and at least one parameter having a value. The value of the parameter represents a probability of producing a component sound.

Figure 2:
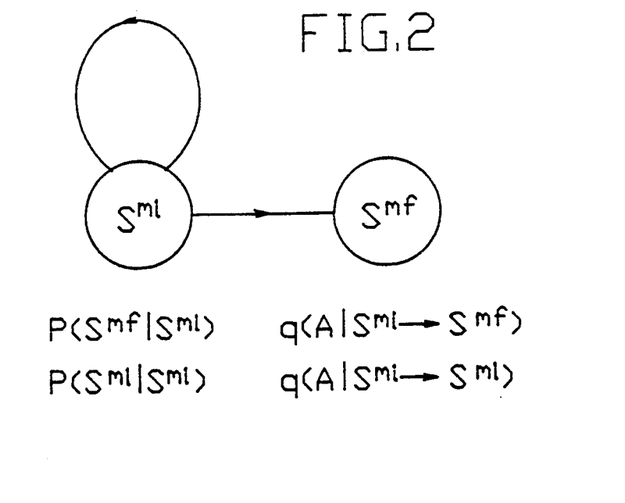
FIG. 2 schematically shows an example of a primitive elemental model for a speech component.

FIG. 2 shows an example of a primitive elemental Markov model for a speech component. The model has a starting state $S^{mi}$ and ending state $S^{mf}$. In this example, the primitive elemental model has four parameters. The primitive elemental model has transition probability parameters $P(S^{mf}|S^{mi})$ and $P(S^{mi}|S^{mi})$ which represent the probabilities of the transitions from the starting state to the ending state and from the starting state back to the starting state, respectively. The primitive elemental model in this example also has parameters $q(A|S^{mi} \rightarrow S^{mf})$ and $q(A|S^{mi} \rightarrow S^{mi})$ representing the probabilities of producing an output A on the transitions from the starting state to the ending state and from the starting state back to the starting state, respectively.

In the case of a primitive elemental model for a speech component, the model parameters determine the probability of outputting one or more component sounds. A component sound is, for example, a single sound or a set of sounds having measured features falling within one or more separate or contiguous ranges.

Figure 3:
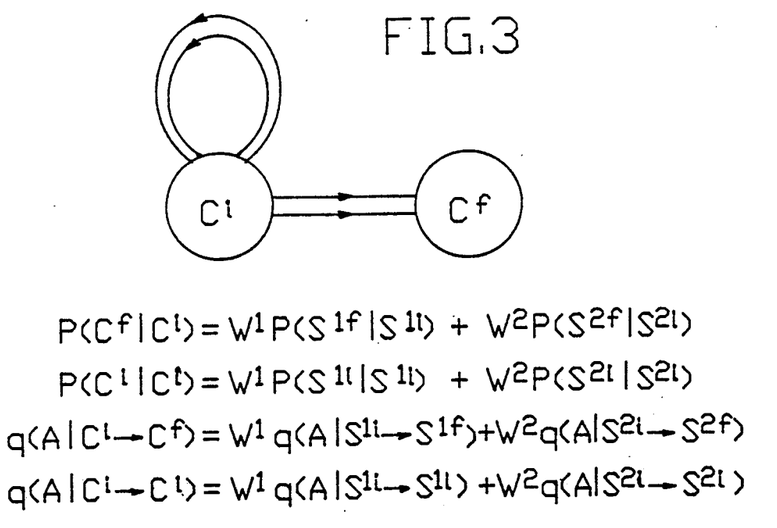
FIG. 3 schematically shows an example of a composite elemental model comprising a combination of at least two primitive elemental models.

Returning to FIG. 1, the starting states of at least first and second primitive elemental models of different speech components are combined to form a composite elemental model. (Step 114) FIG. 3 shows an example of a composite elemental model $M^c$ formed by combining two primitive elemental models $M^1$ and $M^2$. In this example, the starting state $S^{1i}$ of primitive elemental Markov model $M^1$ has been combined with the starting state $S^{2i}$ of primitive elemental Markov model $M^2$ to form the starting state $C^i$ of the composite elemental model $M^c$.

The composite elemental model has at least first and second weighting factors for the first and second primitive elemental models, respectively. Each weighting factor $W^1$ and $W^2$ has a prior value of $W_0^1$ and $W_0^2$, respectively.

The primitive elemental models $M^1$ and $M^2$ are combined by a weighted combination of their parameters in proportion to the values of the weighting factors to form the composite elemental model. Thus, for example, the probability of the transition from the starting state of the composite elemental model to the ending state of the composite elemental model, $P(C^f|C^i)$, is equal to the linear weighted sum of the probability of the transition from the starting state to the ending state of the first model $M^1$ and the probability of the transition from the starting state to the ending state of the second model $M^2$, so that $P(C^f|C^i) = W^1 P(S^{1f}|S^{1i}) + W^2 P(S^{2f}|S^{2i})$. The parameters of the composite elemental model $M^c$ are shown in FIG. 3.

For a set or alphabet of 210 primitive elemental models, it is possible to construct each composite elemental model by a weighted combination of all 210 primitive elemental models. However, in practice it has been found acceptable to construct each composite elemental model as a weighted combination of those 5 or 10 primitive elemental models having the largest weighting factors. The estimation of the weighting factors will be described, below.

A series of elemental models is concatenated to form a word model. (FIG. 1.) At least one elemental model in the series is a composite elemental model. (Step 116)

Figure 4:
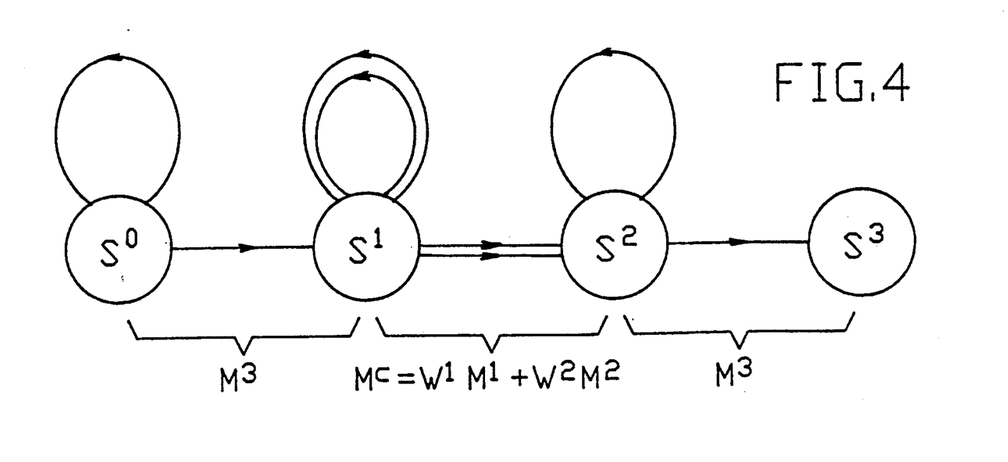
FIG. 4 schematically shows a Markov model of a word formed by concatenating a series of elemental models, one of which is a composite elemental model.

FIG. 4 shows an example of a word model formed by concatenating a series of three elemental models $M^3M^cM^3$.

In order to produce a word model which closely represents the sounds produced when the word is uttered, the word is uttered one or more times. (FIG. 1.) Each utterance of the word produces an observed sequence of component sounds. (Step 118) To obtain a word model which closely represents variations in the pronunciation of the word, the word is uttered a plurality of times by a plurality of different speakers.

From the prior values of the first and second weighting factors and from the values of the parameters of the first and second primitive elemental models, the conditional probability of occurrence of the first primitive elemental model given the occurrence of the composite elemental model and given the occurrence of the observed sequence of component sounds can be estimated. (Step 120, FIG. 1.) As will be described in more detail below, the Forward-Backward algorithm is one method which can be used to estimate the conditional probability. A general description of the Forward-Backward algorithm is provided in, for example, an article by Frederick Jelinek entitled "Continuous Speech Recognition By Statistical Methods" (*Proceedings of the IEEE*, Vol. 64, Apr. 1976, pages 537–556).

Finally, as shown in FIG. 1, a posterior value for the first weighting factor is estimated from the conditional probability. (Step 122)

Figure 5:
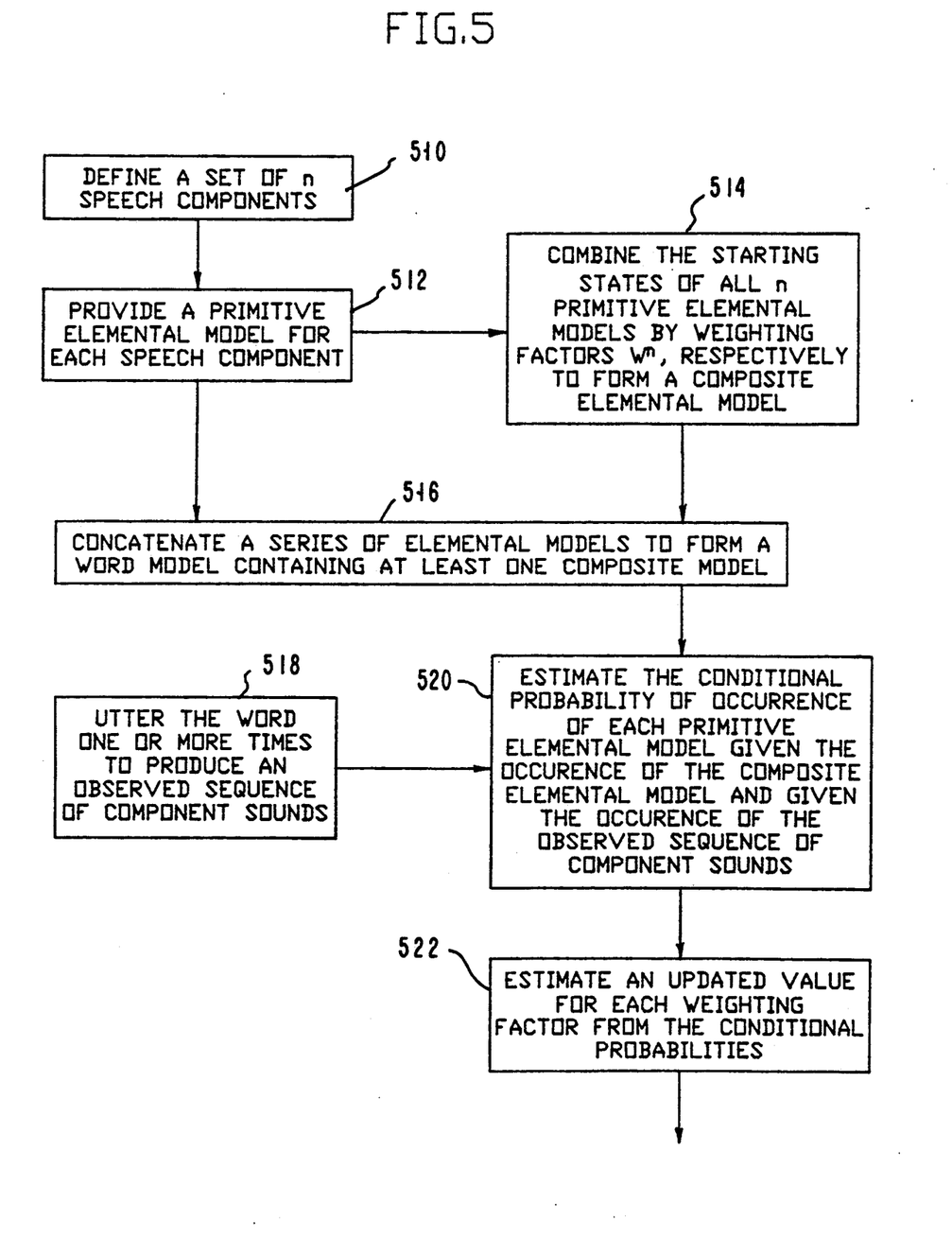
FIG. 5 is a flow chart of an embodiment of the method of modeling a word according to the invention.

The flow chart of FIG. 5 is an embodiment of the FIG. 1 method of modeling a word according to the invention in which the starting states of all n primitive elemental models are combined by weighting factors $W^n$, respectively, to form a composite elemental model. (Step 514) In this case, an updated value for each weighting factor is estimated from the conditional probability of occurrence of the each primitive elemental model given the occurrence of the composite elemental model and given the occurrence of the observed sequence of component sounds. (Steps 520 and 522) The remaining steps 510, 512, 516, and 518 correspond to Steps 110, 112, 116, and 118, respectively, of FIG. 1.

Figure 6:
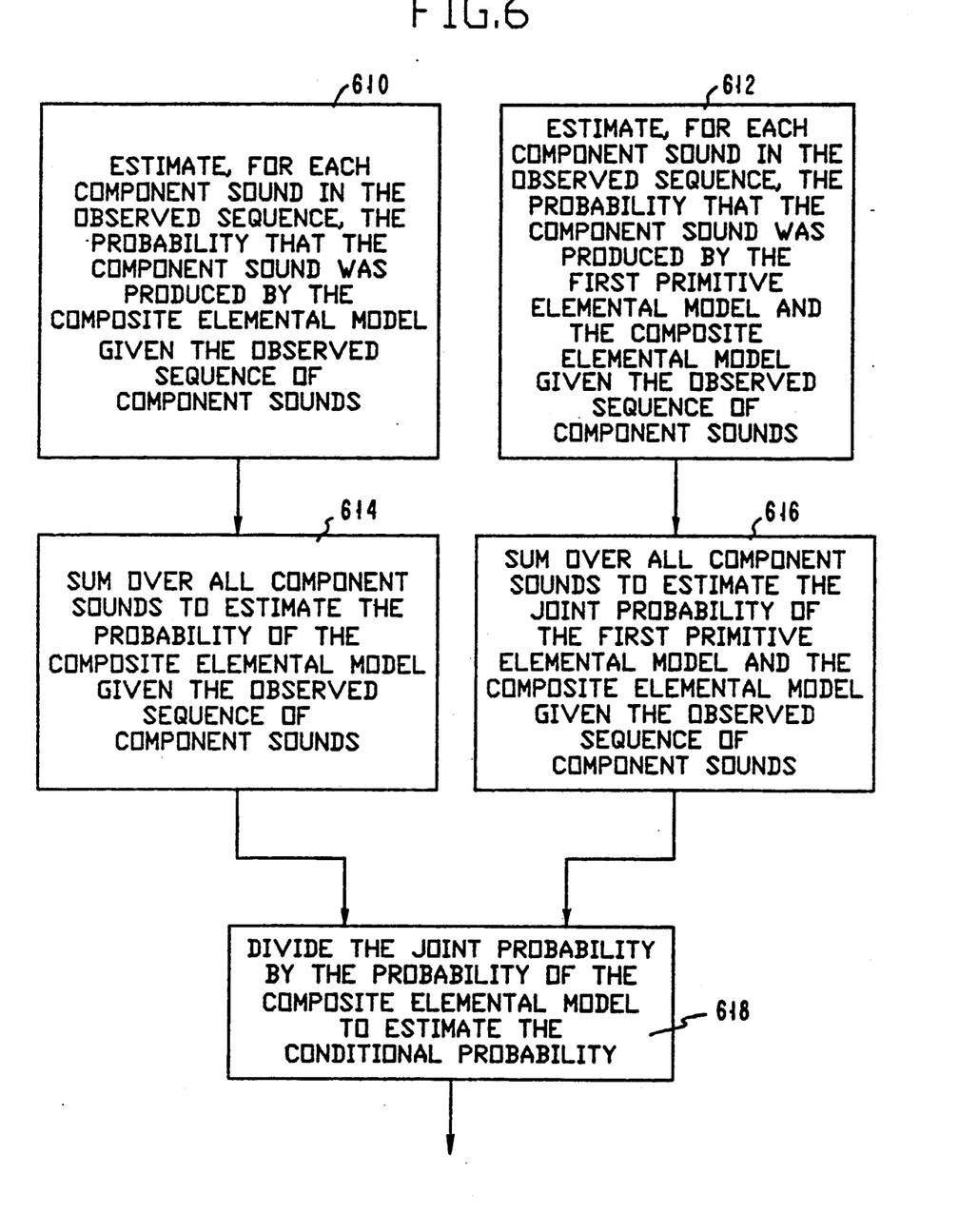
FIG. 6 is a flow chart describing a method of estimating the conditional probability of the method of FIG. 1.

The flow chart of FIG. 6 describes, in more detail, the steps for estimating the conditional probability. For each component sound in the observed sequence of component sounds, the probability that the component sound was produced by the composite elemental model given the occurrence of the observed sequence of component sounds is estimated. (Step 610) Similarly, for each component sound in the observed sequence of component sounds, the probability that the component sound was produced by the first primitive elemental model and the composite elemental model given the occurrence of the observed sequence of component sounds is also estimated. (Step 612)

The Forward-Backward algorithm can be used to estimate the preceding probabilities for each component sound in the observed sequence of component sounds. The Viterbi algorithm will not produce the required estimates. While the Viterbi algorithm can be used to provide binary (1 or 0) estimates of the probability that a component sound was produced by the composite elemental model, the Viterbi algorithm cannot estimate the probability that a component sound was produced by a primitive elemental model and the composite elemental model.

Still referring to FIG. 6, by summing the probability that the component sound was produced by the composite model over all component sounds, one can obtain an estimate of the probability of occurrence of the composite elemental model given the occurrence of the observed sequence of component sounds. (Step 614) By summing the probability that the component sound was produced by the first primitive elemental model and the composite elemental model over all component sounds, the joint probability of occurrence of the first primitive elemental model and the composite elemental model given the occurrence of the observed sequence of component sounds can be estimated. (Step 616) The conditional probability of occurrence of the first primitive elemental model given the occurrence of the composite elemental model and given the occurrence of the observed sequence of component sounds can then be estimated as the ratio of the joint probability to the probability of occurrence of the composite elemental model given the occurrence of the observed sequence of component sounds. (Step 618)

The conditional probability of occurrence of the second primitive elemental model given the occurrence of the composite elemental model and given the occurrence of the observed sequence of component sounds can be estimated in the same manner as for the first primitive elemental model. From this second conditional probability, the second weighting factor can be estimated.

As an alternative to the use of the Forward-Backward algorithm as described above, one can use the Viterbi algorithm to estimate the conditional probability of occurrence of the primitive elemental model given the occurrence of the observed sequence of component sounds, for example, as follows. For each component sound in the observed sequence of component sounds, the Viterbi algorithm is used to provide a binary (1 or 0) estimate of the probability that the component sound was produced by the composite elemental model. For each component sound which was thus estimated as produced by the composite elemental model, an estimate is obtained of the primitive elemental model which most likely produced the component sound. This latter estimate is obtained from the initial weighting factors of the composite elemental model and from the parameters of the primitive elemental models. For each primitive elemental model, the conditional probability of occurrence of the primitive elemental model given the occurrence of the composite elemental model and given the occurrence of the observed sequence of component sounds is estimated as the proportion of the occurrences of the composite elemental model in which the primitive elemental model was the most likely to have produced the observed component sound.

Figure 7:
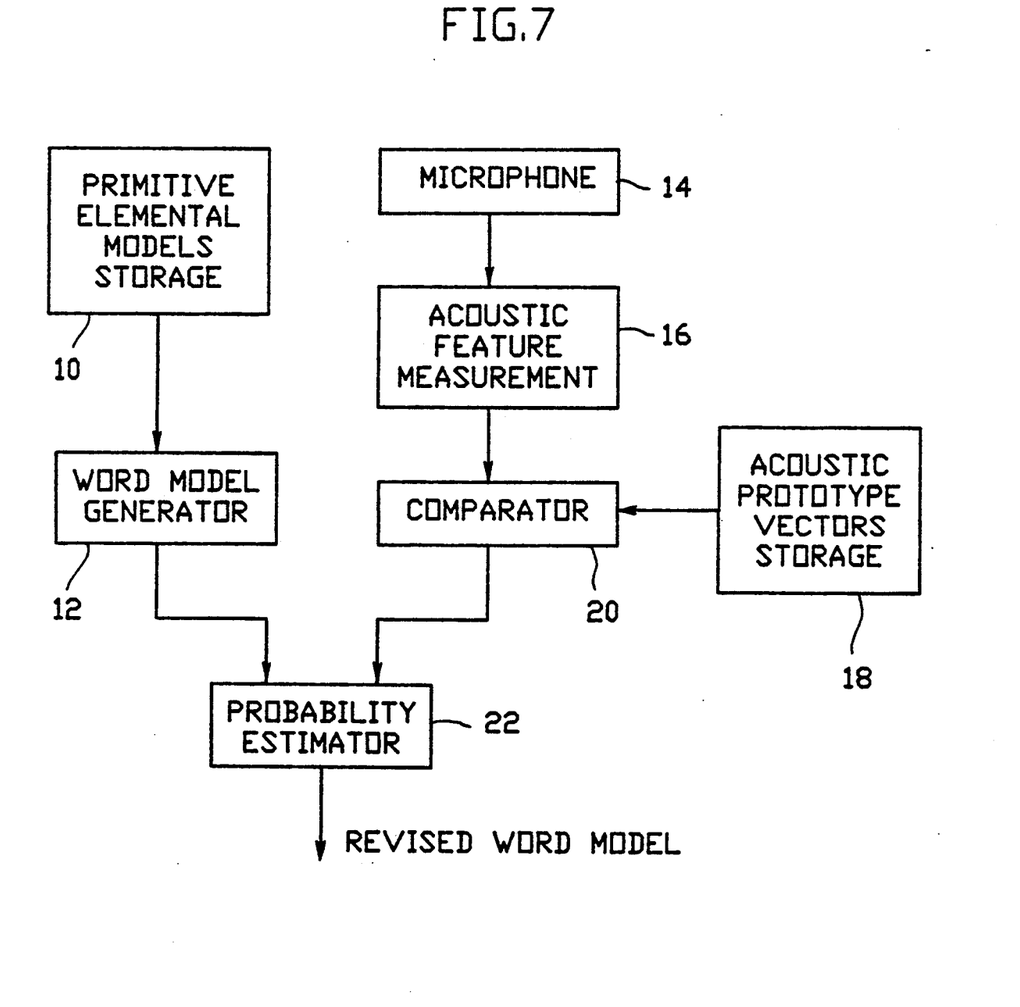
FIG. 7 is a block diagram of an apparatus according to the invention for modeling a word.

FIG. 7 is a block diagram of an apparatus according to the present invention for modeling a word. The apparatus includes means 10 for storing a finite set of n primitive elemental models, where n is an integer greater than or equal to two. A word model generator 12 combines the starting states of at least first and second primitive elemental models of different speech components to form a composite elemental model, and concatenates a series of elemental models to form a word model containing at least one composite elemental model.

Means for measuring the value of at least one feature of one or more utterances of the word may comprise, for example, a microphone 14, an acoustic feature measuring apparatus 16, an acoustic prototype vector storage apparatus 18 and a comparator 20. As described in, for example, U.S. Pat. No. 4,718,094, the acoustic feature measurement apparatus 16 receives the output signal from the microphone 14 and measures the amplitude of the signal in each of a number of selected frequency bands during each of a series of successive time intervals. The measurements corresponding to a time interval are compared by comparator 20 with each of a set of acoustic prototype vectors in storage 18 to find the acoustic prototype vector which is best matched to the measured acoustic features during the selected time interval. The comparator 20 outputs an acoustic label representing the best matched acoustic prototype vector for each time interval to produce a sequence of observed acoustic vector signals (acoustic labels) representing the feature values of the utterances.

A probability estimator 22 estimates, from the prior values of the first and second weighting factors and from the values of the parameters of the first and second primitive elemental models, the conditional probability of occurrence of the first primitive elemental model given the occurrence of the composite elemental model and given the occurrence of the observed sequence of acoustic vector signals. From the conditional probability, probability estimator 22 estimates a posterior value for the first weighting factor.

The apparatus for modeling a word shown in FIG. 7 may use, for example, a fast Fourier transform analyzer for the acoustic feature measurement apparatus 16 for analyzing the signals from microphone 14. The remaining elements of the apparatus may be formed, for example, by suitably programming one or more general purpose digital computers.

After a word model is produced according to the invention, it is stored in, for example, electronic memory. Each word model may be stored as a listing of all of its parameters (that is, all of the states of the word model, all of the probabilities of the transitions between the states of the word model, and all of the probabilities of producing component sounds at each transition of the word model). However, for a large vocabulary of words, storing each word model in this way consumes large amounts of memory.

Preferably, each word model is instead stored not by its parameters, but as a "blueprint", for example, (i) describing the number of composite elemental models forming the word model, (ii) describing the order and identity of each composite elemental model in the string of composite elemental models forming the word model, (iii) listing the primitive elemental models forming each composite elemental model, and (iv) listing, for each composite elemental model, the weighting factors associated with the primitive elemental models. When it is necessary to obtain the word model parameters (such as, for example, to estimate the probability that an utterance to be recognized is the word), the word model parameters can be calculated from the "blueprint" and from the stored parameters of the primitive elemental models. Thus, if the number of primitive elemental models is much less than the number of words in the vocabulary, storing each word model as a "blueprint" consumes much less memory than storing each word model by its parameters. However, the price paid for the reduced storage requirement is the extra time required to calculate the word model parameters each time the word model is needed.

A hypothetical example of the construction of an acoustic model of a word will now be described. As shown in FIG. 4, a series of elemental models $M_3M^3M^3$ is concatenated to form a word model containing at least one composite elemental model. The word is uttered, for example, four times producing the observed sequences of component sounds $X_t$ as shown in Table 1.

TABLE 1

| UTTERANCE | TIME INTERVAL (t) | | | | |
|---|---|---|---|---|---|
| | 1 | 2 | 3 | 4 | 5 |
| $U_1$ | A | B | B | C | A |
| $U_2$ | A | A | B | B | A |
| $U_3$ | A | B | C | B | A |
| $U_4$ | A | B | B | A | A |

In this hypothetical example, the component sounds are identified as A, B, or C. During each time interval, an utterance produces one of the three possible component sounds.

The parameters of the hypothetical primitive elemental models $M^1$, $M^2$, and $M^3$, and the initial or prior weighting factors $W_0^1$ and $W_0^2$ have been assumed to be 0.5.

TABLE 2

| MODEL | $W_0^m$ | $S^i$ | $S^f$ | $P(S^f\|S^i)$ | $P(A\|S^i \to S^f)$ | $P(B\|S^i \to S^f)$ | $P(C\|S^i \to S^f)$ |
|---|---|---|---|---|---|---|---|
| $M^1$ | 1 | $S^0$ | $S^0$ | 0.6 | 0.8 | 0.1 | 0.1 |
| $M^1$ | 1 | $S^0$ | $S^1$ | 0.4 | 0.8 | 0.1 | 0.1 |
| $M^2$ | 0.5 | $S^{1a}$ | $S^1$ | 0.6 | 0.1 | 0.8 | 0.1 |
| $M^2$ | 0.5 | $S^{1a}$ | $S^2$ | 0.4 | 0.1 | 0.8 | 0.1 |
| $M^3$ | 0.5 | $S^{1b}$ | $S^1$ | 0.6 | 0.1 | 0.1 | 0.8 |
| $M^3$ | 0.5 | $S^{1b}$ | $S^2$ | 0.4 | 0.1 | 0.1 | 0.8 |
| $M^1$ | 1 | $S^2$ | $S^2$ | 0.6 | 0.8 | 0.1 | 0.1 |
| $M^1$ | 1 | $S^2$ | $S^3$ | 0.4 | 0.8 | 0.1 | 0.1 |

Figure 8:
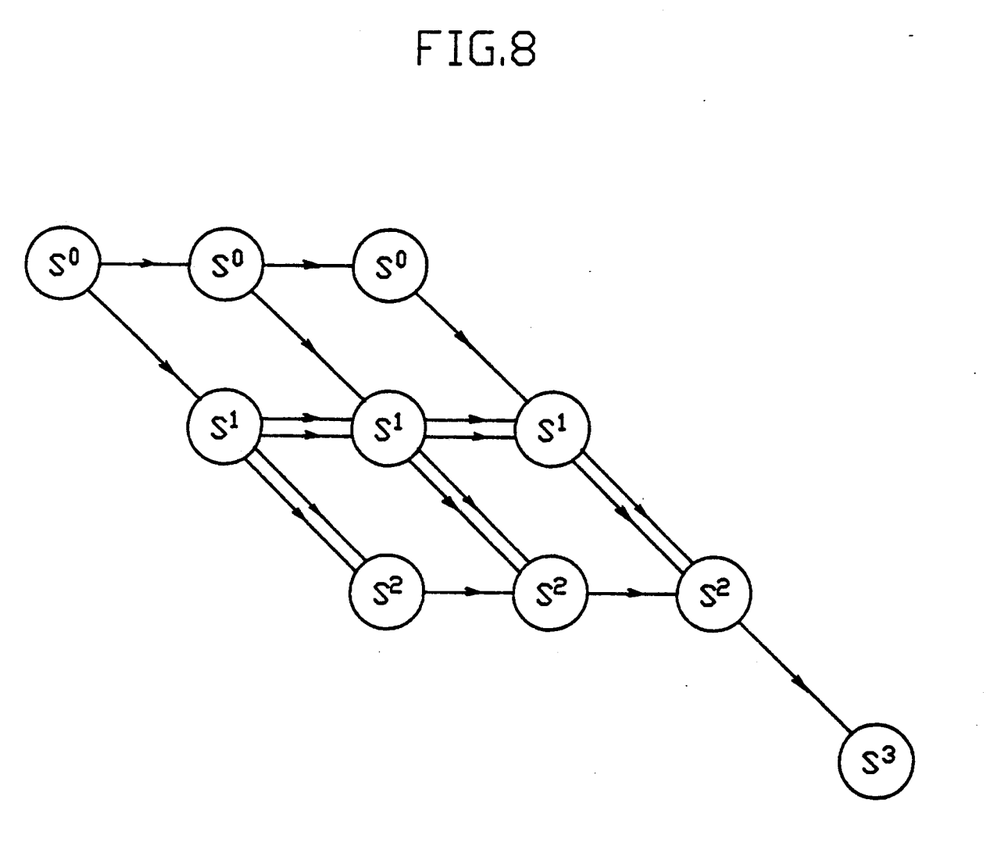
FIG. 8 schematically shows all possible paths through the word Markov model of FIG. 4.

The estimated conditional probability of occurrence of the first primitive elemental model given the occurrence of the composite elemental model and given the occurrence of the observed sequence of components sounds for the hypothetical model $M^3M^CM^3$ and the utterances $U_1$, $U_2$, $U_3$ and $U_4$ is calculated in Tables 3, 4, 5, 6, and 7 using the Forward-Backward algorithm based on the permitted paths through the word model as shown in FIG. 8. In each of Tables 3–6, the probability $P(S^t, X_t|S^{(t-1)})$ of outputting component sound $X_t$ and being in state $S^t$ at time t, given state $S^{(t-1)}$ at time (t−1) is obtained from Table 2 for each transition shown in FIG. 8. The forward probability $P(S^t, X_1^t)$ of being in state $S^t$ at time t and observing the output sequence of component sounds $X_1^t$, where $X_p^q$ represents the sequence $X_p, X_{(p+1)}, \ldots X_q$, is obtained for each state in FIG. 8 from the values of $P(S^t, X_t|S^{(t-1)})$. The backward probability $P(X_t^n, S^{(t-1)})$ of observing the output sequence of component sounds $X_t^n$ and being in the state $S^{(t-1)}$ at time $(t-1)$, is also obtained for each state in FIG. 8 from the values of $P(S^t, X_t|S^{(t-1)})$.

TABLE 3

$U_1 = \{A, B, B, C, A\}$

| $X_t$ | t | $S^{(t-1)}$ | $S^t$ | $P(S^t, X_t|S^{(t-1)})$ | $P(S^t, X_1^t)$ | $P(X_t^5, S^{(t-1)})$ |
|---|---|---|---|---|---|---|
| — | 0 | — | $S^0$ | — | 1 | |
| A | 1 | $S^0$ | $S^0$ | 0.48 | 0.48 | 0.0021399552 |
| A | 1 | $S^0$ | $S^1$ | 0.32 | 0.32 | |
| B | 2 | $S^0$ | $S^0$ | 0.06 | 0.0288 | 0.00089856 |
| B | 2 | $S^0$ | $S^1$ | 0.04 | 0.1056 | |
| B | 2 | $S^{1a}$ | $S^1$ | 0.24 | | 0.00533952 |
| B | 2 | $S^{1b}$ | $S^1$ | 0.03 | | |
| B | 2 | $S^{1a}$ | $S^2$ | 0.16 | 0.0576 | |
| B | 2 | $S^{1b}$ | $S^2$ | 0.02 | | |
| B | 3 | $S^0$ | $S^1$ | 0.04 | 0.029664 | 0.002304 |
| B | 3 | $S^{1a}$ | $S^1$ | 0.24 | | 0.019008 |
| B | 3 | $S^{1b}$ | $S^1$ | 0.03 | | |
| B | 3 | $S^{1a}$ | $S^2$ | 0.16 | 0.022464 | |
| B | 3 | $S^{1b}$ | $S^2$ | 0.02 | | |
| B | 3 | $S^2$ | $S^2$ | 0.06 | | 0.001152 |
| C | 4 | $S^{1a}$ | $S^2$ | 0.02 | 0.00668736 | 0.0576 |
| C | 4 | $S^{1b}$ | $S^2$ | 0.16 | | |
| C | 4 | $S^2$ | $S^2$ | 0.06 | | 0.0192 |
| A | 5 | $S^2$ | $S^3$ | 0.32 | 0.0021399552 | 0.32 |
| — | 6 | $S^3$ | — | — | | 1 |

| t | $S^{(t-1)}$ | $S^t$ | $P(S^{(t-1)}, S^t, X_1^5)$ |
|---|---|---|---|
| 2 | $S^{1a}$ | $S^1$ | 0.0014598144 |
| 2 | $S^{1a}$ | $S^2$ | 0.0000589824 |
| 3 | $S^{1a}$ | $S^1$ | 0.0014598144 |
| 3 | $S^{1a}$ | $S^2$ | 0.0003244032 |
| 4 | $S^{1a}$ | $S^2$ | 0.0001898496 |
| 2 | $S^{1b}$ | $S^1$ | 0.0001824768 |
| 2 | $S^{1b}$ | $S^2$ | 0.0000073728 |
| 3 | $S^{1b}$ | $S^1$ | 0.0001824768 |
| 3 | $S^{1b}$ | $S^2$ | 0.00004055404 |
| 4 | $S^{1b}$ | $S^2$ | 0.0015187968 |

$N(S^{(t-1)} = S^{1a}) = 0.003492864$
$N(S^{(t-1)} = S^1) = 0.0054245376$

TABLE 4

$U_2 = \{A, A, B, B, A\}$

| $X_t$ | t | $S^{(t-1)}$ | $S^t$ | $P(S^t, X_t|S^{(t-1)})$ | $P(S^t, X_1^t)$ | $P(X_t^5, S^{(t-1)})$ |
|---|---|---|---|---|---|---|
| — | 0 | — | $S^0$ | — | 1 | |
| A | 1 | $S^0$ | $S^0$ | 0.48 | 0.48 | 0.0038301696 |
| A | 1 | $S^0$ | $S^1$ | 0.32 | 0.32 | |
| A | 2 | $S^0$ | $S^0$ | 0.48 | 0.2304 | 0.00718848 |
| A | 2 | $S^0$ | $S^1$ | 0.32 | 0.1728 | |
| A | 2 | $S^{1a}$ | $S^1$ | 0.03 | | 0.00118656 |
| A | 2 | $S^{1b}$ | $S^1$ | 0.03 | | |
| A | 2 | $S^{1a}$ | $S^2$ | 0.02 | 0.0128 | |
| A | 2 | $S^{1b}$ | $S^2$ | 0.02 | | |
| B | 3 | $S^0$ | $S^1$ | 0.04 | 0.055872 | 0.002304 |
| B | 3 | $S^{1a}$ | $S^1$ | 0.24 | | 0.019008 |
| B | 3 | $S^{1b}$ | $S^1$ | 0.03 | | |
| B | 3 | $S^{1a}$ | $S^2$ | 0.16 | 0.031872 | |
| B | 3 | $S^{1b}$ | $S^2$ | 0.02 | | |
| B | 3 | $S^2$ | $S^2$ | 0.06 | | 0.001152 |
| B | 4 | $S^{1a}$ | $S^2$ | 0.16 | 0.01196928 | 0.0576 |
| B | 4 | $S^{1b}$ | $S^2$ | 0.02 | | |
| B | 4 | $S^2$ | $S^2$ | 0.06 | | 0.0192 |
| A | 5 | $S^2$ | $S^3$ | 0.32 | 0.0038301696 | 0.32 |
| — | 6 | $S^3$ | — | — | | 1 |

| t | $S^{(t-1)}$ | $S^t$ | $P(S^{(t-1)}, S^t, X_1^5)$ |
|---|---|---|---|
| 2 | $S^{1a}$ | $S^1$ | 0.0001824768 |
| 2 | $S^{1a}$ | $S^2$ | 0.0000073728 |
| 3 | $S^{1a}$ | $S^1$ | 0.0023887872 |
| 3 | $S^{1a}$ | $S^2$ | 0.0005308416 |
| 4 | $S^{1a}$ | $S^2$ | 0.0028606464 |
| 2 | $S^{1b}$ | $S^1$ | 0.0001824768 |
| 2 | $S^{1b}$ | $S^2$ | 0.0000073728 |
| 3 | $S^{1b}$ | $S^1$ | 0.0002985984 |
| 3 | $S^{1b}$ | $S^2$ | 0.0000663552 |

TABLE 4-continued $U_2 = \{A, A, B, B, A\}$

| | | | | |
|---|---|---|---|---|
| 4 | $S^{1b}$ | $S^2$ | 0.0003575808 | |

$N(S^{(t-1)} = S^{1a}) = 0.0059701248$
$N(S^{(t-1)} = S^1) = 0.0068825088$

TABLE 5

$U_1 = \{A, B, C, B, A\}$

| $X_t$ | t | $S^{(t-1)}$ | $S^t$ | $P(S^t, X_t|S^{(t-1)})$ | $P(S^t, X_1^t)$ | $P(X_t^5, S^{(t-1)})$ |
|---|---|---|---|---|---|---|
| — | 0 | — | $S^0$ | — | 1 | |
| A | 1 | $S^0$ | $S^0$ | 0.48 | 0.48 | 0.0021399552 |
| A | 1 | $S^0$ | $S^1$ | 0.32 | 0.32 | |
| B | 2 | $S^0$ | $S^0$ | 0.06 | 0.0288 | 0.00089856 |
| B | 2 | $S^0$ | $S^1$ | 0.04 | 0.1056 | |
| B | 2 | $S^{1a}$ | $S^1$ | 0.24 | | 0.00533952 |
| B | 2 | $S^{1b}$ | $S^1$ | 0.03 | | |
| B | 2 | $S^{1a}$ | $S^2$ | 0.16 | 0.0576 | |
| B | 2 | $S^{1b}$ | $S^2$ | 0.02 | | |
| C | 3 | $S^0$ | $S^1$ | 0.04 | 0.029664 | 0.002304 |
| C | 3 | $S^{1a}$ | $S^1$ | 0.03 | | 0.019008 |
| C | 3 | $S^{1b}$ | $S^1$ | 0.24 | | |
| C | 3 | $S^{1a}$ | $S^2$ | 0.02 | 0.022464 | |
| C | 3 | $S^{1b}$ | $S^2$ | 0.16 | | |
| C | 3 | $S^2$ | $S^2$ | 0.06 | | 0.001152 |
| B | 4 | $S^{1a}$ | $S^2$ | 0.16 | 0.00668736 | 0.0576 |
| B | 4 | $S^{1b}$ | $S^2$ | 0.02 | | |
| B | 4 | $S^2$ | $S^2$ | 0.06 | | 0.0192 |
| A | 5 | $S^2$ | $S^3$ | 0.32 | 0.0021399552 | 0.32 |
| — | 6 | $S^3$ | — | — | | 1 |

| t | $S^{(t-1)}$ | $S^t$ | $P(S^{(t-1)}, S^t, X_1^5)$ |
|---|---|---|---|
| 2 | $S^{1a}$ | $S^1$ | 0.0014598144 |
| 2 | $S^{1a}$ | $S^2$ | 0.0000589824 |
| 3 | $S^{1a}$ | $S^1$ | 0.0001824768 |
| 3 | $S^{1a}$ | $S^2$ | 0.0000405504 |
| 4 | $S^{1a}$ | $S^2$ | 0.0015187968 |
| 2 | $S^{1b}$ | $S^1$ | 0.0001824768 |
| 2 | $S^{1b}$ | $S^2$ | 0.0000073728 |
| 3 | $S^{1b}$ | $S^1$ | 0.0014598144 |
| 3 | $S^{1b}$ | $S^2$ | 0.0003244032 |
| 4 | $S^{1b}$ | $S^2$ | 0.0001898496 |

$N(S^{(t-1)} = S^{1a}) = 0.0032606208$
$N(S^{(t-1)} = S^1) = 0.0054245376$

TABLE 6

$U_2 = \{A, B, B, A, A\}$

| $X_t$ | t | $S^{(t-1)}$ | $S^t$ | $P(S^t, X_t|S^{(t-1)})$ | $P(S^t, X_1^t)$ | $P(X_t^5, S^{(t-1)})$ |
|---|---|---|---|---|---|---|
| — | 0 | — | $S^0$ | — | 1 | |
| A | 1 | $S^0$ | $S^0$ | 0.48 | 0.48 | 0.0038301696 |
| A | 1 | $S^0$ | $S^1$ | 0.32 | 0.32 | |
| B | 2 | $S^0$ | $S^0$ | 0.06 | 0.0288 | 0.00127488 |
| B | 2 | $S^0$ | $S^1$ | 0.04 | 0.1056 | |
| B | 2 | $S^{1a}$ | $S^1$ | 0.24 | | 0.01005696 |
| B | 2 | $S^{1b}$ | $S^1$ | 0.03 | | |
| B | 2 | $S^{1a}$ | $S^2$ | 0.16 | 0.0576 | |
| B | 2 | $S^{1b}$ | $S^2$ | 0.02 | | |
| B | 3 | $S^0$ | $S^1$ | 0.04 | 0.029664 | 0.000512 |
| B | 3 | $S^{1a}$ | $S^1$ | 0.24 | | 0.031104 |
| B | 3 | $S^{1b}$ | $S^1$ | 0.03 | | |
| B | 3 | $S^{1a}$ | $S^2$ | 0.16 | 0.022464 | |
| B | 3 | $S^{1b}$ | $S^2$ | 0.02 | | |
| B | 3 | $S^2$ | $S^2$ | 0.06 | | 0.009216 |
| A | 4 | $S^{1a}$ | $S^2$ | 0.02 | 0.01196928 | 0.0128 |
| A | 4 | $S^{1b}$ | $S^2$ | 0.02 | | |
| A | 4 | $S^2$ | $S^2$ | 0.48 | | 0.1536 |
| A | 5 | $S^2$ | $S^3$ | 0.32 | 0.0038301696 | 0.32 |
| — | 6 | $S^3$ | — | — | | 1 |

| t | $S^{(t-1)}$ | $S^t$ | $P(S^{(t-1)}, S^t, X_1^5)$ |
|---|---|---|---|
| 2 | $S^{1a}$ | $S^1$ | 0.0023887872 |
| 2 | $S^{1a}$ | $S^2$ | 0.0004718592 |
| 3 | $S^{1a}$ | $S^1$ | 0.0003244032 |
| 3 | $S^{1a}$ | $S^2$ | 0.0025952256 |
| 4 | $S^{1a}$ | $S^2$ | 0.0001898496 |
| 2 | $S^{1b}$ | $S^1$ | 0.0002985984 |
| 2 | $S^{1b}$ | $S^2$ | 0.0000589824 |

TABLE 6-continued

| | $U_2 = \{A, B, B, A, A\}$ | | |
|---|---|---|---|
| 3 | $S^{1b}$ | $S^1$ | 0.0000405504 |
| 3 | $S^{1b}$ | $S^2$ | 0.0003244032 |
| 4 | $S^{1b}$ | $S^2$ | 0.0001898496 |

$N(S^{(t-1)} = S^{1a}) = 0.0059701248$
$N(S^{(t-1)} = S^1) = 0.0068825088$

Tables 3–6 also show the calculation of the probabilities $P(S^{t-1}, S^t, X_1^5)$ that the component sound was produced by the composite elemental model given the occurrence of the observed sequence of component sounds for each time period t. By summing over all transitions from stae $S^{1a}$ corresponding to the first primitive elemental model, an estimate is obtained of the probability that the component sound was produced by the first primitive elemental model and the composite elemental model given the occurrence of the observed sequence of component sounds.

$$N(M^1) = N(S^{(t-1)} = S^{1a}) = \sum_{S^{(t-1)} = S^{1a}} P(S^{(t-1)}, S^t, X_1^5) \quad (1)$$

where $S^{1a}$ is the starting state of composite elemental model $M^c$ corresponding to the first primitive elemental model $M^1$.

By summing over all tranistions from state $S^1$ corresponding to the composite elemental model, an estimate is obtained of the probability that the component sound was produced by the composite elemental model given the occurrence of the observed sequence of component sounds.

$$N(M^c) = N(S^{(t-1)} = S^1) = \sum_{S^{(t-1)} = S^1} P(S^{(t-1)}, S^t, X_1^5) \quad (2)$$

where $S^1$ is the starting state of $M^c$ corresponding to $S^{1a}$ or $S^{1b}$ (the starting state of the second primitive elemental model).

Summing over all utterance we get an estimate of the conditional probability of occurrence of the first primitive elemental model given the occurrence of the composite elemental model and given the occurrence of the observed sequence of component sounds $$P(M^1|M^c) = \frac{N(M^1)}{N(M^c)} \quad (3)$$

It is desirable to smooth the estimates of the weighting factors for cases where the data produced by the observed utterances is too small or is randomly skewed. Smoothing can be provided, for example, by the formula $$W = \frac{K_w}{K_w + N(M^c)} W_0 + \frac{N(M^c)}{K_w + N(M^c)} P(M^1|M^c) \quad (4)$$

The summations over all four hypothetical utterances are shown in Table 7.

TABLE 7

$N(M^1) = 0.0186937344$
$N(M^c) = 0.0246140928$
$P(M^1|M^c) = 0.7594728171$
$W_0 = 0.5$
$K_w = 0.1$

TABLE 7-continued $W = 0.5512517313$

The smoothing factor $K_w$ is normally determined experimentally. With a hypothetical smoothing factor $K_w$ of 0.1, from equation (4) the estimated posterior value for the first weighting factor $W_1$ is approximately 0.55.

After obtaining a posterior value for the weighting factors, the method may be repeated a selected number of times, each time using the new values of the weighting factors as the prior values. Alternatively, the method may be repeated until the differences between the posterior values and the prior values of the weighting factors fall below a selected threshold.

Experiment 1

Multi-speaker training data was used to produce word models for the two highly confusable words "a" and "the" using the method according to the present invention. The set (alphabet) of speech components contained 210 different speech components, each represented by a primitive elemental Markov model. The word models were formed by concatenating a series of composite elemental models. Each composite elemental model was initially formed by combining all 210 primitive elemental models, but was subsequently pruned down to a combination of the 5 to 10 primitive elemental models having the largest weighting factors.

Recognition experiments were run using multi-speaker test data and the word models produced above. With these new word models, the error rate was reduced 5 to 10 percent, as compared to the error rate with word models constructed solely of primitive elemental models.

Experiment 2

Multi-speaker training data was used to produce word models for each word in a 5000 word vocabulary using the method according to the present invention. The set (alphabet) of speech components contained 210 different speech components, each represented by a primitive elemental Markov model. The word models were formed by concatenating a series of composite elemental models. Each composite elemental model was initially formed by combining all 210 primative elemental models, but was subsequently pruned down to a combination of the 5 to 10 primitive elemental models having the largest weighting factors.

Each of 10 speakers uttered about 430 sentences of training data to obtain speaker-dependent parameters for the primitive elemental models. Continuous speech recognition experiments were run using the word models produced above in which each speaker uttered 50 sentences containing 591 words. With these new word models, the average error rate for the 10 speakers was reduced 16 percent, as compared to the error rate with word models constructed solely of primitive elemental models.

We claim:
1. A method of modeling a word, said method comprising the steps of:
   defining a finite set of n speech components, where n is an integer greater than or equal to two;
   providing a primitive elemental model for each speech component, each primitive elemental model having at least first and second states, at least one transition from the first state to the second state, and at least one parameter having a value;

combining the first states of at least first and second primitive elemental models of different speech components to form a composite elemental model having at least first and second weighting factors, respectively, each weighting factor having a prior value, said primitive elemental models being combined by a weighted combination of their parameters in proportion to the values of the weighting factors;

concatenating a series of elemental models to form a word model, at least one elemental model in the series being the composite elemental model;

uttering the word one or more times, each utterance of the word producing an observed sequence of component sounds;

estimating, from the prior values of the first and second weighting factors and from the values of the parameters of the first and second primitive elemental models, the conditional probability of occurrence of the first primitive elemental model given the occurrence of the composite elemental model and given the occurrence of the observed sequence of component sounds; and estimating a posterior value for the first weighting factor from the conditional probability.

2. A method of modeling a word, said method comprising the steps os:

defining a finite set of n speech components, where n is an integer greater than or equal to two;

providing a primitive elemental model for each speech component, each primitive elemental model having at least first and second states, at least one transition from the first state to the second state, and at least one parameter having a value;

combining the first states of at least first and second primitive elemental models of different speech components to form a compositie elemental model having at least first and second weighting factors, respectively, each weighting factor having a prior value, said primitive elemental models being combined by a weighted combination of their parameters in proportion to the values of the weighting facotrs;

concatenating a series of elemental models to form a word model, at least one elemental model in the series being the composite elemental model;

uttering the word one or more times, each utterance of the word producing an observed sequence of component sounds;

estimating, from the prior values of the first and second weighting factors and from the values of the parameters of the first and second primitive elemental models, the conditional probability of occurrence of the first primitive elemental model given the occurrence of the composite elemental model and given the occurrence of the observed sequence of component sounds; and estimating a posterior value for the first weighting factor from the conditional probability;

characterized in that the step of estimating the conditional probability of occurrence of the first primitive elemental model given the occurrence of the composite elemental model and given the occurrence of the observed sequence of component sounds comprises the steps of:

estimating, from the prior values of the first and second weighting factors and from the values of the parameters of the first and second primitive elemental models, the probability of occurrence of the composite elemental model given the occurrence of the observed sequence of component sounds;

estimating, from the prior values of the first and second weighting factors and from the values of the parameters of the first and second primitive elemental models, the joint probability of occurrence of the first primitive elemental model and the composite elemental model given the occurrence of the observed sequence of component sounds; and estimating the conditional probability as the ratio of the joint probability to the probability of occurrence of the composite elemental model given the observed sequence of component sounds.

3. A method as claimed in claim 2, characterized in that:

the step of estimating the probability of occurrence of the composite elemental model given the occurrence of the observed sequence of component sounds comprises the step of estimating, for each component sound in the observed sequence of component sounds, the probability that the component sound was produced by the composite elemental model given the occurrence of the observed sequence of component sounds; and the step of estimating the joint probability of occurrence of the first primitive elemental model and the composite elemental model given the occurrence of the observed sequence of component sounds comprises the step of estimating, for each component sound in the observed sequence of component sounds, the probability that the component sound was produced by the first primitive elemental model and the composite elemental model given the occurrence of the observed sequence of component sounds.

4. A method as claimed in claim 3, characterized in that the method further comprises the steps of:

estimating, from the prior values of the first and second weighting factors and from the values of the parameters of the first and second primitive elemental models, the conditional probability of occurrence of the second primitive elemental model given the occurrence of the composite elemental model and given the occurrence of the observed sequence of component sounds; and estimating a posterior value for the second weighting factor from the second conditional probability.

5. A method as claimed in claim 4, characterized in that the step of combining the first states of the first and second primitive elemental models comprises the step of combining the first states of the first and second primitive elemental models by a linear weighted combination.

6. A method as claimed in claim 5, characterized in that the step of uttering the word one or more times comprises the step of uttering the word a plurality of times by a plurality of different speakers.

7. A method as claimed in claim 6, characterized in that the value of the parameter of each primitive elemental model represents a probability of producing a component sound.

8. An apparatus for modeling a word, said apparatus comprising:

means for storing a finite set of n primitive elemental models, where n is an integer greater than or equal to two, each primitive elemental model representing a speech component, each primitive elemental model having at least first and second states, at least one transition from the first state to the second state, and at least one parameter having a value;

means for combining the first states of at least first and second primitive elemental models of different speech components to form a composite elemental model having at least first and second weighting factors, respectively, each weighting factor having a prior value, said primitive elemental models being combined by a weighted combination of their parameters in proportion to the values of the weighting factors;

means for concatenating a series of elemental models to form a word model, at least one elemental model in the series being the composite elemental model;

means for measuring the value of at least one feature of one or more utterances of the word, each utterance occurring over a series of successive time intervals, said means measuring the feature value of the utterance during each time interval to produce a sequence of observed acoustic vector signals representing the feature values;

means for estimating, from the prior values of the first and second weighting factors and from the values of the parameters of the first and second primitive elemental models, the conditional probability of occurrence of the first primitive elemental model given the occurrence of the composite elemental model and given the occurrence of the observed sequence of acoustic vector signals; and means for estimating a posterior value for the first weighting factor from the conditional probability.

9. An apparatus for modeling a word, said apparatus comprising:

means for storing a finite set of n primitive elemental models, where n is an integer greater than or equal to two, each primitive elemental model representing a speech component, each primitive elemental model having at least first and second states, at least one transition from the first state to the second state, and at least one parameter having a value;

means for combining the first states of at least first and second primitive elemental models of different speech components to form a composite elemental model having at least first and second weighting factors, respectively, each weighting factor having a prior value, said primitive elemental models being combined by a weighted combination of their parameters in proportion to the values of the weighting factors;

means for concatenating a series of elemental models to form a word model, at least one elemental model in the series being the composite elemental model;

means for measuring the value of at least one feature of one or more utterances of the word, each utterance occurring over a series of successive time intervals, said means measuring the feature value of the utterance during each time interval to produce a sequence of observed acoustic vector signals representing the feature values;

means for estimating, from the prior values of the first and second weighting factors and from the values of the parameters of the first and second primitive elemental models, the conditional probability of occurrence of the first primitive elemental model given the occurrence of the composite elemental model and given the occurrence of the observed sequence of acoustic vector signals; and means for estimating a posterior value for the first weighting factor from the conditional probability;

characterized in that the means for estimating the conditional probability of occurrence of the first primitive elemental model given the occurrence of the composite elemental model and given the ocurrence of the observed sequence of acoustic vector signals comprises:

means for estimating, from the prior values of the first and second weighting factors and from the values of the parameters of the first and second primitive elemental models, the probability of occurrence of the composite elemental model given the occurrence of the observed sequence of acoustic vectors signals;

means for estimating, from the prior values of the first and second weighting factors and from the values of the parameters of the first and second primitive elemental models, the joint probability of occurrence of the first primitive elemental model and the composite elemental model given the occurrence of the observed sequence of acoustic vector signals; and means for estimating the conditional probability as the ratio of the joint probability to the probability of occurrence of the composited elemental model given the observed sequence of acoustic vector signals.

10. An apparatus as claimed in claim 9, characterized in that:

the means for estimating the probability of occurrence of the composite elemental model given the occurrence of the observed sequence of acoustic vector signals comprises means for estimating, for each acoustic vector signal in the observed sequence of acoustic vector signals, the probability that the acoustic vector signal was produced by the composite elemental model given the occurrence of the observed sequence of acoustic vector signals; and the step of estimating the joint probability of occurrence of the first primitive elemental model and the composite elemental model given the occurrence of the observed sequence of acoustic vector signals comprises means for estimating, for each acoustic vector signal in the observed sequence of acoustic vector signals, the probability that the acoustic vector signal was produced by the first primitive elemental model and the composite elemental model given the occurrence of the observed sequence of acoustic vector signals.

11. An apparatus as claimed in claim 10, further comprising:

means for estimating, from the prior values of the first and second weighting factors and from the values of the parameters of the first and second primitive elemental models, the conditional probability of occurrence of the second primitive elemental model given the occurrence of the composite elemental model and given the occurrence of the observed sequence of acoustic vector signals; and means for estimating a posterior value for the second weighting factor from the second conditional probability.

12. An apparatus as claimed in claim 11, characrterized in that the means for combining th first states of the first and second primitive elemental models comprises means for combining the first states of the first and second primitive elemental models by a linear weighted combination.

13. A method of modeling a word, said method comprising the steps of:
   defining a finite set of n speech components, where n is an integer greater than or equal to two;
   providing a primitive elemental model for each speech component, each primitive elemental model having at least first and second states, at least one transition from the first state to the second state, and at least one parameter having a value;
   combining the first states of all n primitive elemental models to form a set of composite elemental models, each composite elemental model having n weighting factors $W^n$ for the n primitive elemental models, respectively, each weighting factor having a prior value, for each composite elemental model said primitive elemental models being combined by a weighted combination of their parameters in proportion to the values of the weighting factors;
   concatenating a series of composite elemental models to form a word model;
   uttering the word one or more times, each utterance of the word producing an observed sequence of component sounds;
   estimating, from the prior values of the weighting factors and from the values of the parameters of the primitive elemental models, the conditional probability of occurrence of each primitive elemental model given the occurrence of each composite elemental model and given the occurrence of the observed sequence of component sounds; and
   estimating a posterior value for each weighting factor from the conditional probabilities.

14. A method of modeling a word, said method comprising the steps of:
   defining a finite set of n speech components, where n is an integer greater than or equal to two;
   providing a primitive elemental model for each speech component, each primitive elemental model having at least first and second states, at least one transition from the first state to the second state, and at least one parameter having a value;
   combining the first states of all n primitive elemental models to form a set of composite elemental models, each composite elemental model having n weighting factors $W^n$ for the n primitive elemental models, respectively, each weighting factor having a prior value, for each composite elemental model said primitive elemental models being combined by a weighted combination of their parameters in proportion to the values of the weighting factors;
   concatenating a series of composite elemental models to form a word model;
   uttering the word one or more times, each utterance of the word producing an observed sequence component sounds;
   estimating, from the prior values of the weighting factors and from the values of the parameters of the primitive elemental models, the conditional probability of occurrence of each primitive elemental model given the occurrence of each composite elemental model and given the occurrence of the observed sequence of component sounds; and
   estimating a posterior value for each weighting factor from the conditional probabilities;
   characterized in that the step of estimating the conditional probability of occurrence of a primitive elemental model given the occurrence of a composite elemental model and given the occurrence of the observed sequence of component sounds comprises the steps of:
   estimating, from the prior values of the weighting factors and from the values of the parameters of the primitive elemental models, the probability of occurrence of the composite elemental model given the occurrence of the observed sequence of component sounds;
   estimating, from the prior values of the weighting factors and from the values of the parameters of the primitive elemental models, the joint probability of occurrence of the primitive elemental model and the composite elemental model given the occurrence of the observed sequence of component sounds; and
   estimating the conditional probability as the ratio of the joint probability to the probability of occurrence of the composite elemental model given the observed sequence of component sounds.

15. A method as claimed in claim 14, characterized in that:
   the step of estimating the probability of occurrence of a composite elemental model given the occurrence of the observed sequence of component sounds comprises the step of estimating, for each component sound in the observed sequence of component sounds, the probability that the component sound was produced by the composite elemental model given the occurrence of the observed sequence of component sounds; and
   the step of estimating the joint probability of occurrence of a primitive elemental model and a composite elemental model given the occurrence of the observed sequence of component sounds comprises the step of estimating, for each component sound in the observed sequence of component sounds, the probability that the component sound was produced by the first primitive elemental model and the composite elemental model given the occurrence of the observed sequence of component sounds.

16. A method as claimed in claim 15, characterized in that the step of combining the first states of the primitive elemental models comprises the step of combining the first states of the primitive elemental models by a linear weighted combination.

17. A method as claimed in claim 16, characterized in that the step of uttering the word one or more times comprises the step of uttering the word a plurality of times by a plurality of different speakers.

18. A method as claimed in claim 17, characterized in that the value of the parameter of each primitive elemental model represents a probability of producing a component sound.

* * * * *